(12) United States Patent
Lindberg et al.

(10) Patent No.: US 8,226,148 B2
(45) Date of Patent: Jul. 24, 2012

(54) SUN SCREEN FOR A MOTOR VEHICLE

(75) Inventors: Joergen Lindberg, Uddevalla (SE); Lars Ekstroem, Göteborg (SE); Martin Sjöström, Trollhättan (SE); Christer Waldemarsson, Trollhättan (SE)

(73) Assignee: GM Global Technology Operations LLC, Detroit, MI (US)

( * ) Notice: Subject to any disclaimer, the term of this patent is extended or adjusted under 35 U.S.C. 154(b) by 336 days.

(21) Appl. No.: 12/619,989

(22) Filed: Nov. 17, 2009

(65) Prior Publication Data

US 2010/0127528 A1    May 27, 2010

(30) Foreign Application Priority Data

Nov. 17, 2008  (DE) .................. 10 2008 057 640

(51) Int. Cl.
*B60J 3/00* (2006.01)
(52) U.S. Cl. ................... 296/97.2; 296/97.1
(58) Field of Classification Search .............. 296/97.1, 296/97.2
See application file for complete search history.

(56) References Cited

U.S. PATENT DOCUMENTS

| | | | | |
|---|---|---|---|---|
| 1,898,276 A | * | 2/1933 | Van Dresser | 296/97.1 |
| 2,140,959 A | * | 12/1938 | Jacobs | 296/97.1 |
| 2,506,689 A | * | 5/1950 | Simpson et al. | 160/354 |
| 3,695,680 A | * | 10/1972 | Van Sickle | 296/97.2 |
| 4,239,278 A | | 12/1980 | Skilliter, Jr. | |
| 4,384,740 A | * | 5/1983 | Marrotta | 296/97.1 |
| 4,890,875 A | | 1/1990 | Takahashi | |
| 5,054,839 A | * | 10/1991 | White et al. | 296/97.1 |
| 5,779,298 A | * | 7/1998 | Smelser et al. | 296/97.1 |
| 5,975,616 A | * | 11/1999 | Eple et al. | 296/97.1 |
| 5,984,398 A | | 11/1999 | Crotty, III | |
| 7,192,075 B1 | * | 3/2007 | Asai | 296/97.1 |
| 2006/0091692 A1 | * | 5/2006 | Ogawa | 296/97.1 |
| 2006/0232094 A1 | | 10/2006 | Graf | |

FOREIGN PATENT DOCUMENTS

| | | |
|---|---|---|
| DE | 3151315 A1 | 7/1983 |
| DE | 8311570 U1 | 9/1984 |
| DE | 10340006 A1 | 3/2004 |
| FR | 1222766 A | 6/1960 |
| JP | 9226368 A | 9/1997 |

OTHER PUBLICATIONS

British Patent Office, British Search Report for British Application No. GB0919779.9, Feb. 24, 2010.
German Patent Office, German Search Report for Application No. 102008057640.9, dated Nov. 17, 2008.

* cited by examiner

*Primary Examiner* — Lori Lyjak
(74) *Attorney, Agent, or Firm* — Ingrassia Fisher & Lorenz, P.C.

(57) ABSTRACT

In the case of a sun screen, in particular for a motor vehicle, the sunscreen includes, but is not limited to a sunlight shading body, which at least partly has a transparent or lucent material and a fixing body for fixing the sun screen, in particular to the motor vehicle, e.g., to a roof area of an auto body of the motor vehicle, the range of vision of the driver or of the front-seat passenger is substantially not to be limited by the sun screen on the one hand and the edge of the sunlight shading body is not to represent a risk of injury to the driver and front-seat passenger, on the other hand.

19 Claims, 1 Drawing Sheet

SUN SCREEN FOR A MOTOR VEHICLE

CROSS-REFERENCE TO RELATED APPLICATION

This application claims priority to German Patent Application No. 102008057640.9, filed Nov. 17, 2008, which is incorporated herein by reference in its entirety.

TECHNICAL FIELD

The instant invention relates to a sun screen and to a motor vehicle.

BACKGROUND

The driver or the front-seat passenger in motor vehicles can be blinded by solar radiation in the front seats in motor vehicles. Sun screens are present in motor vehicles for the purpose of protecting the front passengers of the motor vehicle against a blinding caused by the sun. The sun screens are thereby generally fastened in the roof area of the motor vehicle above the windshield so as to be capable of being pivoted. If necessary, due to a correspondingly oriented solar radiation to the front passengers of the motor vehicle, the sun screen can be pivoted or folded, so that the passengers are no longer blinded by the solar radiation. A sunlight shading body of the sun screen is thereby often non-transparent, so that the range of vision of the driver or of the front-seat passenger is limited. However, this leads to a safety reduction, because the surroundings of the motor vehicle, for example a traffic light, can thus no longer be observed.

DE 103 40 006 A1 shows a sun screen with a variable transparency comprising a sunlight shading body, in which several openings are embodied, a sheet, which can slide relative to the sunlight shading body and in which several openings as well as a sheet slit are embodied and a controller, which can interact with the sheet slit, so as to slide to displace the sheet relative to the sunlight shading body, so that the openings in the sheet can be moved relative to the openings in the sunlight shading body, so as to change the degree of light permeability of the sun screen. In this sun screen, the degree of light permeability can thus be adapted to the desired view of the driver.

It is furthermore known to use sun screens comprising sunlight shading bodies, which consist of a translucent material. Like sunglasses, the translucent sunlight shading bodies reduce the solar radiation to the driver or to the front-seat passenger and thus reduce the blinding by the sun. At the same time, however, it is possible to see through the translucent sun shading body, so that the range of vision of the front passengers is substantially not limited by the sun screen and so that there is no reduction of safety connected thereto. In a disadvantageous manner, however, an edge or a flange, respectively, made of a thin plastic disk having a small thickness is present at the edge of the sunlight shading body in the case of these sun shading bodies, which leads to a risk of injury to the passengers at this edge.

At least one object of the instant invention is thus to provide a sun screen and a motor vehicle, in the case of which, on the one hand, the range of vision of the driver or of the front-seat passenger is substantially not limited by the sun shading and, on the other hand, in the case of which the edge of the sunlight shading body essentially does not represent a risk of injury to the driver and front-seat passenger.

SUMMARY

This at least one object is solved by means of a sun screen, in particular for a motor vehicle, comprising a sunlight shading body, which at least partly consists of a transparent or lucent material and at least one means for fixing the sun screen, in particular to the motor vehicle, e.g., a roof area of an auto body of the motor vehicle, wherein the sun screen, in particular the sunlight shading body, encompasses a safety bead at the edge for the purpose of reducing the risk of injury to persons at the sun screen. The safety bead embodied at the edge of the transparent sunlight shading body considerably reduces the risk of injury to persons, in particular in response to an accident. The edge of the sunlight shading body is thus no longer embodied with a small thickness or so as to be edged, so that the risk of injury to persons at the edge of the sunlight shading body is reduced considerably.

In particular, the thickness of the safety bead, is more than 1 mm greater than the thickness of the sun screen, e.g., in particular of the sunlight shading body. Due to the greater thickness of the safety bead as compared to the sunlight shading body, the risk of injury to persons on the edge of the sunlight shading body can be reduced. In general, the sunlight shading body consists of a thin plastic disk, so that without a corresponding enlarged thickness of the safety bead there is a risk of injury on the edge of the sunlight shading body.

Preferably, the thickness of the safety bead is greater than an area of the sunlight shading body, which abuts directly on the safety bead. The thickness of the safety bead is more than 3 mm, for example.

In a supplemental embodiment, the area of the sunlight shading body, which abuts directly on the safety bead, encompasses a distance of less than 5 cm from the safety bead.

In an alternative, the safety bead encompasses a shape, which is bent or rounded on the outside. The bent or rounded shape of the safety bead considerably reduces the risk of injury to persons on the edge of the sunlight shading body. There are thus no sharp edges, so that a passenger is thus prevented from cutting himself on the edge of the sunlight shading body, for example.

Advantageously, the cross section of the safety bead is approximately circular or ellipsoidal, e.g. comprising a radius of greater than or equal to 3.2 mm. Due to the circular or elliptical shape of the safety bead in the cross section, the safety bead partly encompasses the shape of a pipe, so that sharp edges, where injuries are possible, do not form at the safety bead. Furthermore, the greater thickness of the safety bead as compared to the thin sunlight shading body has the result that a larger surface is available in the case of an impact of a passenger on the edge of the sunlight shading body, so that the forces occurring per unit area are considerably smaller than in the case of an edge comprising a small thickness.

In a further embodiment, the safety bead and the sunlight shading body have a one-piece embodiment. In the case of a one-piece embodiment of the safety bead and of the sunlight shading body, errors can be avoided during the assembly, for example, and the safety bead is also furthermore prevented from detaching from the sunlight shading body in response to the use of the sun screen, for example in a motor vehicle, so that a particularly high safety is thus ensured.

In particular, the safety bead and the sunlight shading body are produced in a one-piece manner by means of injection molding, so that the production costs are low.

In a further embodiment, the safety bead consists at least partly of a transparent or lucent material, e.g. plastic, and/or at least partly of an elastic material, e.g. rubber. In the case of an embodiment of the safety bead made of a transparent or a lucent material, such as the sunlight shading body, the range of vision of the passenger is only slightly limited by means of the safety bead, because the safety bead substantially does not limit the range of vision due to the transparency of the safety bead. A safety bead embodied of an elastic material, e.g. rubber, has the additional advantage that a cushioning occurs when passengers impact the safety bead, so that the risk of injury is thus additionally reduced.

In particular, the safety bead is a separate component, which is fastened to the sunscreen, in particular to the sunlight shading body, e.g. by means of a positive and/or non-positive and/or a material connection.

In an alternative, the safety bead and the sunlight shading body are embodied in two pieces and the safety bead is fastened to the sunlight shading body by means of a positive and/or non-positive and/or a material connection.

In a further embodiment, the safety bead is fastened to the sunlight shading body by means of adhesion and/or by means of a locking connection and/or by means of a welded connection. The safety bead and the sunlight shading body are hereby two separate components. For example, a groove, into which the edge of the sunlight shading body is inserted and is glued therein, is embodied at the safety bead. Furthermore, it is also possible to fasten the safety bead to the sunlight shading body by means of a locking connection. For example, the groove, into which the sunlight shading body is inserted, is thereby provided with latches, which engage with corresponding recesses in the area of the edge of the sunlight shading body. The locking connection is thereby preferably embodied so as to be non-detachable.

In a supplementary alternative, the sun screen encompasses a fixing body, which is in particular impervious to light and the sunlight shading body is fastened to the fixing body. For this purpose, a groove, into which the sunlight shading body is inserted and fastened, is embodied at the fixing body. For example, the fastening thereby takes place in a positive and/or non-positive and/or material connection. For example, the sunlight shading body is fastened in the fixing body by means of adhesion or by means of a locking connection. For example, the fixing body can also be embodied in two pieces, so that the sunlight shading body is partly fastened between an upper and a lower half of the fixing body.

In a further embodiment, the fixing body consists at least partly of plastic. Preferably, the sunlight shading body consists at least partly of plastic.

In a further alternative, the means for fixing the sun screen, e.g. a joint and/or a fixing arm, is embodied on the fixing body or on the sunlight shading body. For this purpose, recesses or joints, in which the fixing arm is fastened, are embodied on the fixing body. The end of the fixing arm is thereby fastened in the roof area of the auto body of a motor vehicle.

The motor vehicle according to the invention comprises a sun screen, which is described in this application.

In a further embodiment, the sun screen is fixed to the motor vehicle so as to be capable of being pivoted.

In an additional alternative, the sun screen can be moved and/or pivoted about three perpendicular axes.

Advantageously, the sun screen comprises one or two fixing arms and/or one or two hinges, by means of which the sun screen can be fixed.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
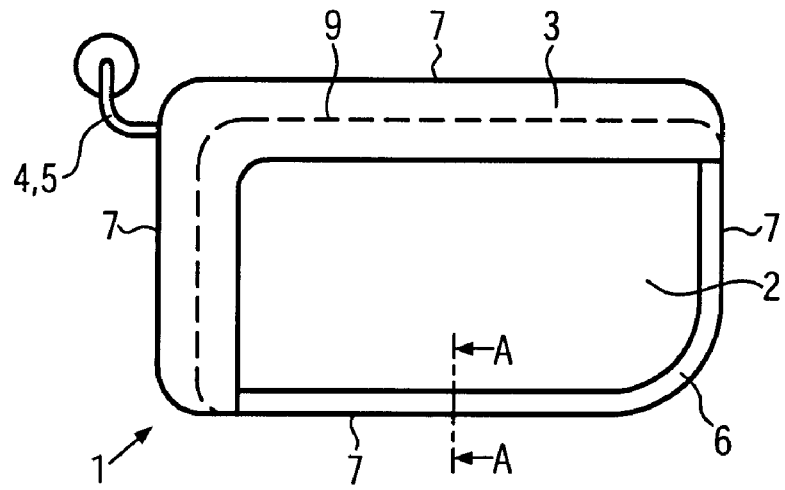
FIG. 1 shows a view of a sun screen.

FIG. 1 illustrates a view of a sun screen 1 for a motor vehicle. The sun screen 1 is thereby fastened above a windshield in the roof area of an auto body of the motor vehicle and is capable of being pivoted. In response to solar radiation to the front passengers of the motor vehicle, the sun screen is oriented to the effect that the solar radiation does not cause the front passengers of the motor vehicle to be blinded (not illustrated).

The sun screen 1 comprises a fixing body 3 and a sunlight shading body 2. The fixing body 3 is embodied in two pieces and consists of plastic. A gap, in which the sunlight shading body 2 is fastened, forms between an upper and a lower half (not illustrated) of the fixing body 3. An end 9 of the sunlight shading body 2 is illustrated by a dashed line within the fixing body 3. Due to the fact that they consist of plastic, the non-illustrated upper and lower half of the fixing body 3 are thereby welded together. The sunlight shading body 2 is a disk-shaped body made of plastic and is lucent. The sunlight shading body 2 is thereby colored with a brownish hue, for example, so that the sunlight shading body 2 is capable of reducing the blinding of persons sitting in the front seats of the motor vehicle, according to the principle of sunglasses. The thickness of the fixing body 3 is considerably greater than the thickness of the sunlight shading body 2. An edge 7 of the fixing body 3 is thereby rounded, so that the risk of injury to persons on the sun screen 1 is reduced. The thickness of the fixing body 3 is thereby in the range of between 0.5 and 4 cm, for example.

The thickness of the disk-shaped sunlight shading body 2 is in the range of between 0.1 and 2 cm, so that the thickness of the sunlight shading body 2 is considerably smaller than the thickness of the fixing body 3. To reduce the risk of injury to the passengers on the edge 7 of the sunlight shading body 2, a safety bead 6 is embodied on the edge 7. The thickness of the safety bead 6 is thereby greater than the thickness of the sunlight shading body 2 outside of the edge 7 of the sunlight shading body 2 or of the safety bead 6, respectively. The thickness of the safety bead 6 is thereby preferably in the range of the thickness of the fixing body 3, e.g. in the range of between 0.5 and 4 cm. The cross section of the safety bead 6 is embodied so as to be approximately circular, so that it encompasses a bent or rounded shape on the outside. The risk of injury to persons on the sunlight shading body 2 can thus be reduced considerably, because, on the one hand, sharp edges do not form due to the rounded shape and, on the other hand, because the forces occurring per unit area in response to an impact of passengers on the safety bead 6, for example in response to an accident, are reduced because of the greater thickness of the safety bead 6 as compared to the rest of the sunlight shading body 2.

Figure 2:
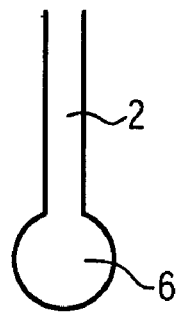
FIG. 2 shows a section A-A according to FIG. 1 of the sun screen in a first exemplary embodiment.

In the first exemplary embodiment illustrated in FIG. 2, the safety bead 6 is embodied in one piece with the sunlight shading body 2. The sunlight shading body 2 and the safety bead 6 are thereby produced by means of injection molding in a tool, which encompasses a corresponding shape for the sunlight shading body 2 as well as for the safety bead 6. Advantageously, the costs for the production of the sunlight shading body 2 comprising the safety bead 6 are thus particularly low.

Figure 3:
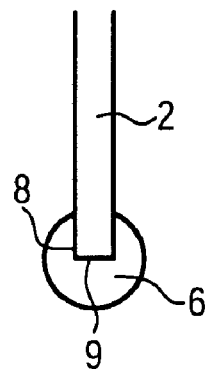
FIG. 3 shows a section A-A according to FIG. 1 of the sun screen in a second exemplary embodiment.

In the second exemplary embodiment illustrated in FIG. 3, the sunlight shading body 2 and the safety bead 6 are embodied in two pieces. The safety bead 6 consists of an elastic and transparent rubber, the cross section of which is embodied so as to be substantially circular and which has a groove 8. The thickness of the groove 8 is thereby slightly smaller than the thickness of the sunlight shading body 2. For the purpose of fixing the safety bead 6, the safety bead 6 comprising the groove 8 is pushed onto the end 9 of the sunlight shading body 2. For a permanent fixation, an adhesive is furthermore applied in the grove 8. The band-shaped safety bead 6 is thus connected at the sunlight shading body 2 by means of the occurring elastic forces caused by the small thickness of the groove 8 as compared to the thickness of the sunlight shading body 2 as well as in a material connection by means of the non-illustrated adhesive. Advantageously, the risk of injury to persons is thus reduced even further, because an impact of persons on the safety bead 6 can be cushioned additionally due to the elastic characteristics of the safety bead 6.

A fixing arm 5 is fastened to the fixing body 3 as means 4 for fixing the sun screen 1 to a roof area of an auto body of the motor vehicle (FIG. 1). The fixing arm 5 is thereby fastened in a non-illustrated borehole of the fixing body 3 and is capable of being pivoted therein about an axis of rotation, which corresponds to the axis of the borehole. Furthermore, the fixing arm 5 is fastened to the auto body of the motor vehicle (not illustrated) in such a manner that the fixing arm 5 is capable of being pivoted about the longitudinal axis of the fixing arm 5 on the auto body as axis of rotation. The sun screen 1 at the borehole is thus capable of being pivoted in the fixing body 3 as well as in the fixing arm 5 arranged therein, e.g., from the roof area in the direction towards the windshield and the sun screen 1 is capable of being pivoted at the fastening in the roof area, for example from the area of the windshield to a side window.

Taken as a whole, considerable advantages are connected with the sun screen 1 according to the invention and with the motor vehicle according to the invention. Due to the available safety bead, the risk of injury is greatly reduced in the case of a lucent sunlight shading body 2 comprising a smaller thickness.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A sun screen a motor vehicle, comprising:
   a sunlight shading body that at least partly comprises a material; and
   at least one means for fixing the sun screen to a roof area of an auto body of the motor vehicle,
   wherein the sunlight shading body encompasses a safety bead at an edge and a first thickness of the safety bead is greater than a second thickness of the sunlight shading body.

2. The sun screen of claim 1, wherein the material comprises a transparent material.

3. The sun screen of claim 1, wherein the material comprises a lucent material.

4. The sun screen according to claim 1 wherein a thickness of the safety bead is greater than an area of the sunlight shading body, which abuts directly on the safety bead.

5. The sun screen according to claim 4, wherein the area of the sunlight shading body, which abuts directly on the safety bead encompasses a distance of less than approximately 5 cm from the safety bead.

6. The sun screen according to claim 1, wherein the safety bead encompasses a bent shape on an outside.

7. The sun screen according to claim 1, wherein the safety bead encompasses a rounded shape on an outside.

8. The sun screen according to claim 1, wherein a cross section of the safety bead is approximately circular and has a radius of at least 3.2 mm.

9. The sun screen according to claim 1, wherein a cross section of the safety bead is approximately ellipsoidal and has a radius of at least 3.2 mm.

10. The sun screen according to claim 1, wherein the safety bead and the sunlight shading body are embodied in one piece.

11. The sun screen according to claim 1, wherein the safety bead and the sunlight shading body are produced in a one-piece manner via injection molding.

12. The sun screen according to claim 1, wherein the safety bead and the sunlight shading body are embodied in two pieces and the safety bead is fastened to the sunlight shading body via a connection.

13. The sun screen according to claim 12, wherein the connection is a positive.

14. The sun screen according to claim 12, wherein the connection is a material connection.

15. The sun screen according to claim 12, wherein the safety bead is fastened to the sunlight shading body via an adhesive.

16. The sun screen according to claim 12, wherein the safety bead is fastened to the sunlight shading body via a locking connection.

17. The sun screen according to claim 12, wherein the safety bead is fastened to the sunlight shading body via a welded connection.

18. The sun screen according to claim 1, wherein the sun screen encompasses a fixing body that is substantially impervious to light, and the sunlight shading body is fastened to the fixing body.

19. The sun screen according to claim 18, wherein the at least one means for fixing the sun screen is embodied on the fixing body.

* * * * *